(12) United States Patent
Peoples et al.

(10) Patent No.: US 9,340,432 B2
(45) Date of Patent: May 17, 2016

(54) PROCESS FOR THE SYNTHESIS OF MAGNESIUM ALUMINATE SPINELS

(71) Applicants: Brian Peoples, Lake Charles, LA (US); David Barclay, Lake Charles, LA (US); Mark Chavez, Lake Charles, LA (US); Allison Hann, Westlake, LA (US); Andrea Brasch, Meldorf (DE); Klaus P. G. Diblitz, Schenefeld (DE)

(72) Inventors: Brian Peoples, Lake Charles, LA (US); David Barclay, Lake Charles, LA (US); Mark Chavez, Lake Charles, LA (US); Allison Hann, Westlake, LA (US); Andrea Brasch, Meldorf (DE); Klaus P. G. Diblitz, Schenefeld (DE)

(73) Assignee: Sasol Performance Chemicals GmbH, Hamburg (DE)

( * ) Notice: Subject to any disclaimer, the term of this patent is extended or adjusted under 35 U.S.C. 154(b) by 0 days.

(21) Appl. No.: 14/390,987

(22) PCT Filed: Apr. 15, 2013

(86) PCT No.: PCT/US2013/036581
§ 371 (c)(1),
(2) Date: Oct. 6, 2014

(87) PCT Pub. No.: WO2013/155518
PCT Pub. Date: Oct. 17, 2013

(65) Prior Publication Data
US 2015/0183651 A1 Jul. 2, 2015

Related U.S. Application Data (60) Provisional application No. 61/623,866, filed on Apr. 13, 2012, provisional application No. 61/811,318, filed on Apr. 12, 2013.

(51) Int. Cl.
*C01F 7/00* (2006.01)
*C01F 7/16* (2006.01)
*C04B 35/26* (2006.01)
*C04B 35/443* (2006.01)

(52) U.S. Cl.
CPC ............. *C01F 7/162* (2013.01); *C04B 35/2683* (2013.01); *C04B 35/443* (2013.01); *C01P 2002/32* (2013.01); *C01P 2002/72* (2013.01); *C01P 2006/80* (2013.01); *C04B 2235/3206* (2013.01); *C04B 2235/3218* (2013.01); *C04B 2235/3222* (2013.01); *C04B 2235/441* (2013.01); *C04B 2235/76* (2013.01); *C04B 2235/763* (2013.01)

(58) Field of Classification Search
None
See application file for complete search history.

(56) References Cited

U.S. PATENT DOCUMENTS

| | | | |
|---|---|---|---|
| 4,912,078 A * | 3/1990 | Krijgsman | 502/341 |
| 5,108,979 A * | 4/1992 | Magnabosco et al. | 502/304 |
| 6,800,578 B2 | 10/2004 | Stamires et al. | |
| 7,208,446 B2 | 4/2007 | Stamires et al. | |
| 7,341,976 B2 | 3/2008 | Espinoza et al. | |
| 7,807,128 B2 | 10/2010 | Sanchez-Valente | |

FOREIGN PATENT DOCUMENTS

DE 4227720 4/1993

* cited by examiner

*Primary Examiner* — Steven Bos
(74) *Attorney, Agent, or Firm* — Bushman Werner, P.C.

(57) ABSTRACT

Magnesium aluminate spinels are made by hydrothermally aging an aqueous slurry of a spinel precursor which can be (a) a mixture of boehmite alumina and a magnesium precursor, (b) an aluminum magnesium oxide or hydroxide, and (c) mixtures thereof. At least one of the aged slurries is dried to remove water and produce at least one dried spinel precursor. The dried spinel precursor is then calcined to produce the magnesium aluminate spinel.

25 Claims, 6 Drawing Sheets

PROCESS FOR THE SYNTHESIS OF MAGNESIUM ALUMINATE SPINELS

CROSS REFERENCE TO RELATED APPLICATION

This application is a National Phase of PCT/US2013/036581 filed Apr. 15, 2013, which claims priority to U.S. Application No. 61/623,866 filed on Apr. 13, 2012, and U.S. Application No. 61/811,318 filed on Apr. 12, 2013, the disclosures of which are incorporated herein by reference for all purposes.

FIELD OF THE INVENTION

The present invention relates to spinels, and more particularly, to the production of magnesium aluminate spinels.

BACKGROUND OF THE INVENTION

Spinets, in general, are a class of minerals having the general formula $A^{2+}B_2^{3+}O_4^{2-}$. Aluminum spinels include spinel, $MgAl_2O_4$, gahnite, $ZnAl_2O_4$, hercynite, $FeAl_2O_4$. Although spinels are found in nature, because of the increasing demand synthetic spinels are now being made by various methods.

Presently, spinels are used as windows and domes in high-speed missiles and pods. Although silicate glasses are suitable for most common window uses, they are too weak to be used in the latter applications. Furthermore, missile domes, pod windows, and other transparent armor must transmit light wavelengths up to 5 µm, whereas silicate glasses do not transmit well beyond wavelengths of 2 µm. Although zinc sulfside transmits to beyond 5 µm, it is too weak to be used as transparent armor. Magnesium aluminate spinel is a polycrystalline ceramic material that has excellent optical and mechanical properties. It transmits wavelengths of light from 0.2-5.5 µm and ballistic testing has shown that 0.25 inch of spinel has the same resistance as 2.5 inches of bullet proof glass. Spinel is therefore an excellent candidate for transparent armor in light vehicles and goggles or face shields on infantry helmets.

The synthesis of spinels of the type in consideration is well-known in the literature. In this regard, it is well established that an intimate mixture of the component materials is desirable in order to obtain a high conversion to spinel upon thermal treatment. There are many syntheses of magnesium aluminate spinels in the literature. The majority of these can be divided into three basic classes: coprecipitation of aluminum and magnesium salts; ball milling of magnesium and aluminum precursors; and wet mixing of alumina and magnesium compounds. Each of these process have inherent limitations which limits their ability on an industrial/commercial scale. For example, all of these methods suffer from a similar problem of residual inclusions, mainly of unconverted precursors, which cause undesired dispersion of lightwaves passing through the spinel.

SUMMARY OF THE INVENTION

In one aspect, the present invention provides a method for the industrial scale production of magnesium aluminate spinels.

In another aspect, there is provided a method for the production of magnesium aluminate spinels comprising hydrothermally treating a spinel precursor.

In yet another aspect, the present invention provides a method of producing aluminum and magnesium spinels of high optical quality with low residual unconverted inclusions.

In still another aspect of the present invention there is provided a method for the production of magnesium aluminate spinels employing hydrothermally treating a mixture of a slurry of boehmite and a suspension of a magnesium precursor.

In still another aspect of the present invention there is provided a method for the production of magnesium aluminate spinels employing the hydrothermal treatment of a slurry of a spinel precursor comprised of aluminum magnesium oxides and hydroxides obtained by cohydrolyzing mixed aluminum and magnesium alkoxides.

In another aspect of the present invention, there is provided a method of making a spinel precursor comprising hydrothermally aging an aqueous slurry of a spinel precursor selected from the group consisting of (a) a mixture of boehmite alumina and a magnesium precursor, (b) an aluminum magnesium oxide or hydroxide, and (c) mixtures thereof, to produce a hydrothermally aged spinel precursor selected from the group consisting of (1) an aged spinel precursor slurry comprising boehmite alumina and magnesium precursor, (2) an aged spinel precursor slurry comprising an aluminum magnesium oxide or hydroxide, and (3) mixtures thereof.

These and further features and advantages of the present invention will become apparent from the following detailed description, wherein reference is made to the figures in the accompanying drawings.

DETAILED DESCRIPTION OF PREFERRED EMBODIMENTS

As used herein, the term "magnesium precursor" refers to a magnesium compound which when, according to the method of the present invention, is converted to magnesium aluminate spinel, does not deleteriously affect the purity of the spinel as for example by introducing extraneous compounds or mixtures thereof into the spinel which impair the use of the thus produced spinel for its intended purpose. Suitable magnesium precursors can include magnesium hydroxide, magnesium nitrate, magnesium oxide, magnesium acetate, and magnesium carbonate Method A In this aspect of present invention (Method A) a slurry of boehmite alumina and a suspension of a magnesium precursor is formed to produce an intimate mixture of the magnesium and aluminum compounds. The mixture is then hydrothermally aged. The aged magnesium aluminate spinel precursor thus formed is recovered, e.g., by spray drying. The dried precursor is then calcined. Thus, according to Method A, an alumina slurry and a suspension of a magnesium precursor are mixed together and hydrothermally aged, preferably with stirring at elevated temperatures and optionally at elevated pressures, following which the suspension is spray-dried and calcined at elevated temperatures to form the desired spinel product. While magnesium hydroxide is a preferred magnesium precursor, other suitable magnesium precursor include magnesium nitrate, magnesium oxide, magnesium acetate, and magnesium carbonate. The boehmite alumina can be produced by hydrolysis of an aluminum alkoxide made as described below with respect to Method C.

Method B

Method B is a slight variation of Method A wherein a boehmite alumina is aged separately and then the aged boehmite slurry is mixed with the suspension of the magnesium precursor, the aqueous mixture being dried to recover the spinel precursor. This precursor can then be calcined to produce the spinel.

Method C

In this aspect of the present invention (Method C) a mixture of an aluminum alkoxide and a magnesium alkoxide is cohydrolyzed to produce a slurry of a spinel precursor comprised of aluminum magnesium oxides and hydroxides, the slurry being hydrothermally aged. Following the aging, solid aged spinel precursor is recovered, e.g., by spray drying, and the resulting dried spinel precursor is calcined to produce the magnesium aluminate spinel.

According to the present invention, it has surprisingly been found that the hydrothermal aging of a spinel precursor obtained by one Method A (use of an aqueous mixture of boehmite alumina and a magnesium precursor), Method B (variant of Method A), or Method C (cohydrolysis of mixed aluminum and magnesium alkoxides) improves the purity of the resulting spinels obtained following calcination. Further, in Method B, variant of Method A, boehmite alumina can be hydrothermally aged in the absence of the magnesium precursor, following which the aged boehmite slurry and an aqueous suspension of the magnesium precursor can be mixed, the water being removed to leave the dried spinel precursor, the dried precursor then being calcined. More particularly, the amount of residual aluminum oxide and/or magnesium oxide in the spinel is reduced when hydrothermal aging of the precursor according to one of Method A, Method B, or Method C is performed.

Regarding Method C, alcoholates (alkoxides) of many metals including magnesium and aluminum can be formed by methods well known to those skilled in the art by reacting the metals with mono-, di-, or tri-hydric $C_1$ to $C_{40}$ alcohols. See in this respect U.S. Pat. No. 6,514,473, incorporated herein by reference for all purposes. Preferably the alcohols employed in making the alkoxides of the present invention are $C_4$ to $C_{20}$ alcohols, most preferably from $C_6$ to $C_{20}$ alcohols.

In the process of the present invention according to Method C, the mixed aluminum and magnesium alkoxides are cohydrolyzed to produce a slurry of a spinel precursor comprising aluminum magnesium oxides and/or hydroxides and the resultant alcohol. The alcohol is removed leaving behind a substantially aqueous slurry of the spinel precursor. Any small amounts of alcohol dissolved in the aqueous phase can be removed, e.g., by steam stripping. The slurry is then hydrothermally aged under suitable conditions of temperature and, if desired, pressure, following which the slurry is dried and the resultant dry spinel precursor recovered. Preferably the slurry is stirred during the aging step. The dried spinel precursor is then calcined.

Regardless of which method is employed, the amount of the aluminum precursor and the magnesium precursor will be selected such that the resulting spinel has a ratio of magnesium oxide to aluminum oxide of from about 0.85:1.0 to about 1.15:1.0, preferably from about 0.98:1.0 to about 1.02:1.0, and most preferably 1.1:1.0.

Generally speaking, regardless of whether Method A, Method B, or Method C is used, the slurry is hydrothermally aged at a temperature of from about 100 to about 210° C. for a period of from about 1 to about 6 hours, preferably from about 2 to about 6 hours. Pressures employed in the aging step can range from about 200 to about 2,000 kPa. The calcination can be conducted at temperatures of from about 750 to about 1,600° C.

To illustrate the present invention, the following non-limiting examples are presented. Examples 1-4 generally employ Method A, Method B being exemplified by Example 5, while Examples 6 and 7 employ Method C

EXAMPLE 1

Figure 1:
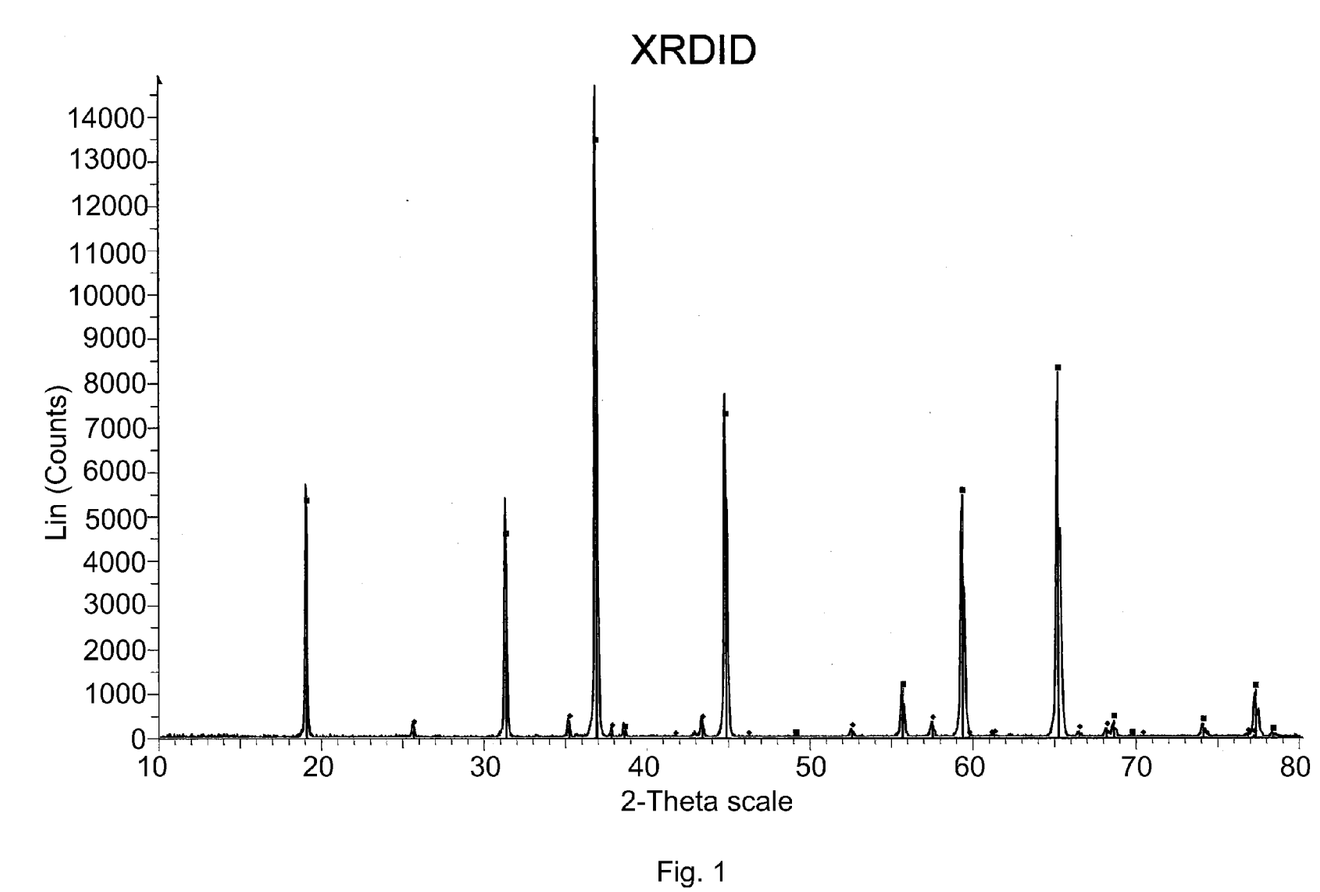
FIG. 1 is an X-ray diffraction pattern of a magnesium aluminate spinel produced according to one aspect of the present invention.

In this example, 2160 g of DI water, 6.12 g of formic acid, 6000 g of 10.2 wt % $Al_2O_3$ Catapal B[1] slurry, was mixed and stirred with 349.9 g of $Mg(OH)_2$ and charged to a 5 gallon autoclave reactor. The reactor was stirred at 150 rpm for two hours at a temperature of 100° C. The reactor was emptied and the product spray dried and calcined at 1375° C. for eight hours. XRD analysis, shown in FIG. 1, demonstrated high conversion to magnesium aluminate spinel with little contamination from $Al_2O_3$ or MgO. In this regard, note the small peak at 43 degrees 2-theta indicative a very little amount of residual alpha alumina and/or magnesium oxide.

[1] Boehmite marketed by Sasol North America, Inc.

EXAMPLE 2

Figure 2:
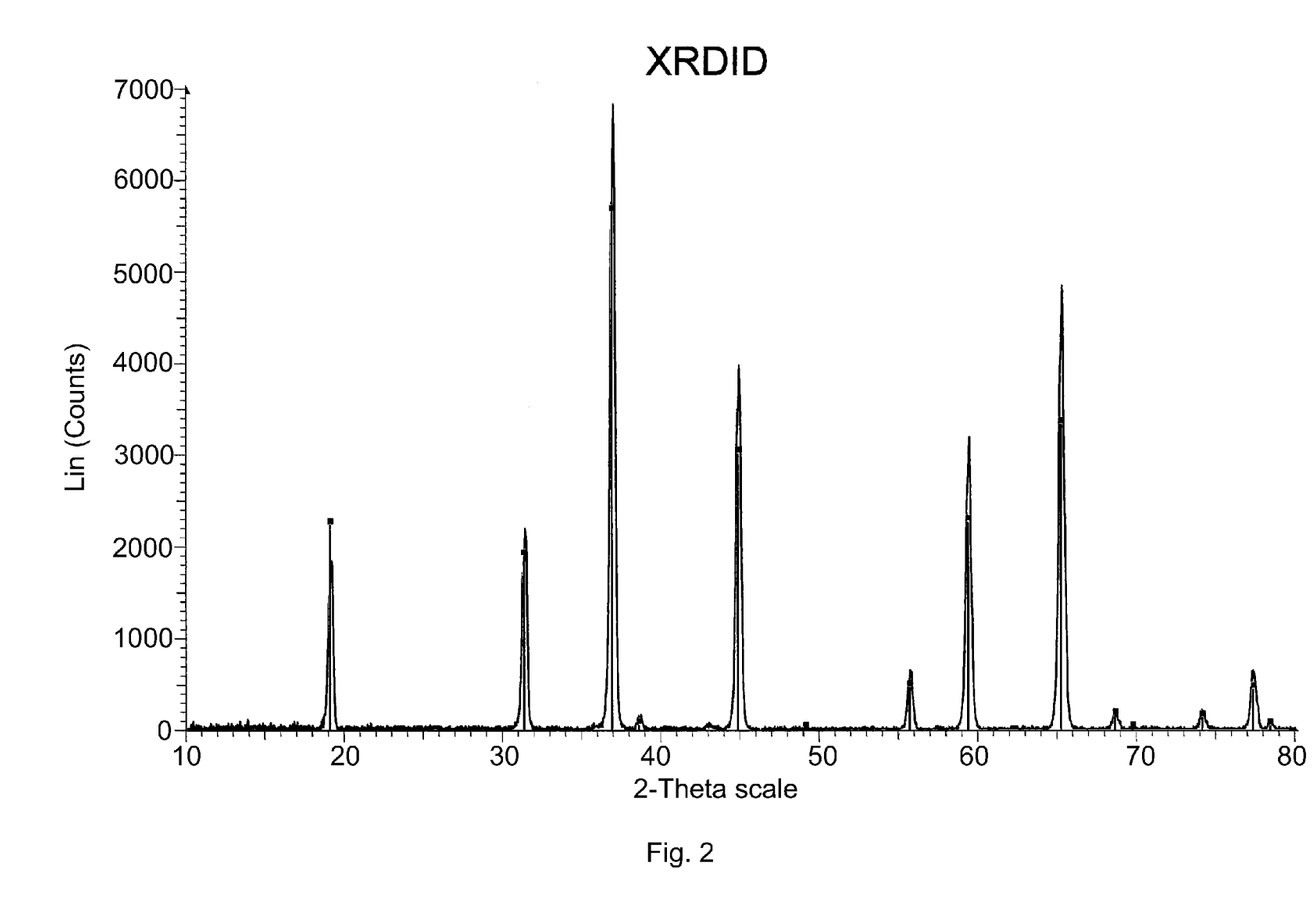
FIG. 2 is an X-ray diffraction pattern of a magnesium aluminate spinel obtained according to another aspect of the present invention.

In this example, 600 mL DI water, 20 g of formic acid and 92.6 g of UHPA SB1[2] (Boehmite) powder were stirred together until well dispersed. 40.6 g $Mg(OH)_2$ was then slowly added which caused the viscosity to increase. DI water was added until the viscosity decreased to a usable level. 1000 mL of the resulting suspension was charged to a 1 gallon autoclave reactor where it was stirred at 150 rpm and 200° C. for two hours. The product was removed from the reactor, spray dried and calcined at 1375° C. for eight hours. XRD analysis of the material, shown in FIG. 2, demonstrated high conversion to magnesium aluminate spinel with little contamination from $Al_2O_3$ or MgO. Again, note the small peak at 43 degrees 2-theta indicating very small amount of residual alpha alumina and/or magnesium oxide.

[2] Boehmite powder marketed by Sasol North America, Inc.

The following, comparative Examples 3 and 4, show the effects of not using hydrothermal aging.

EXAMPLE 3

Figure 3:
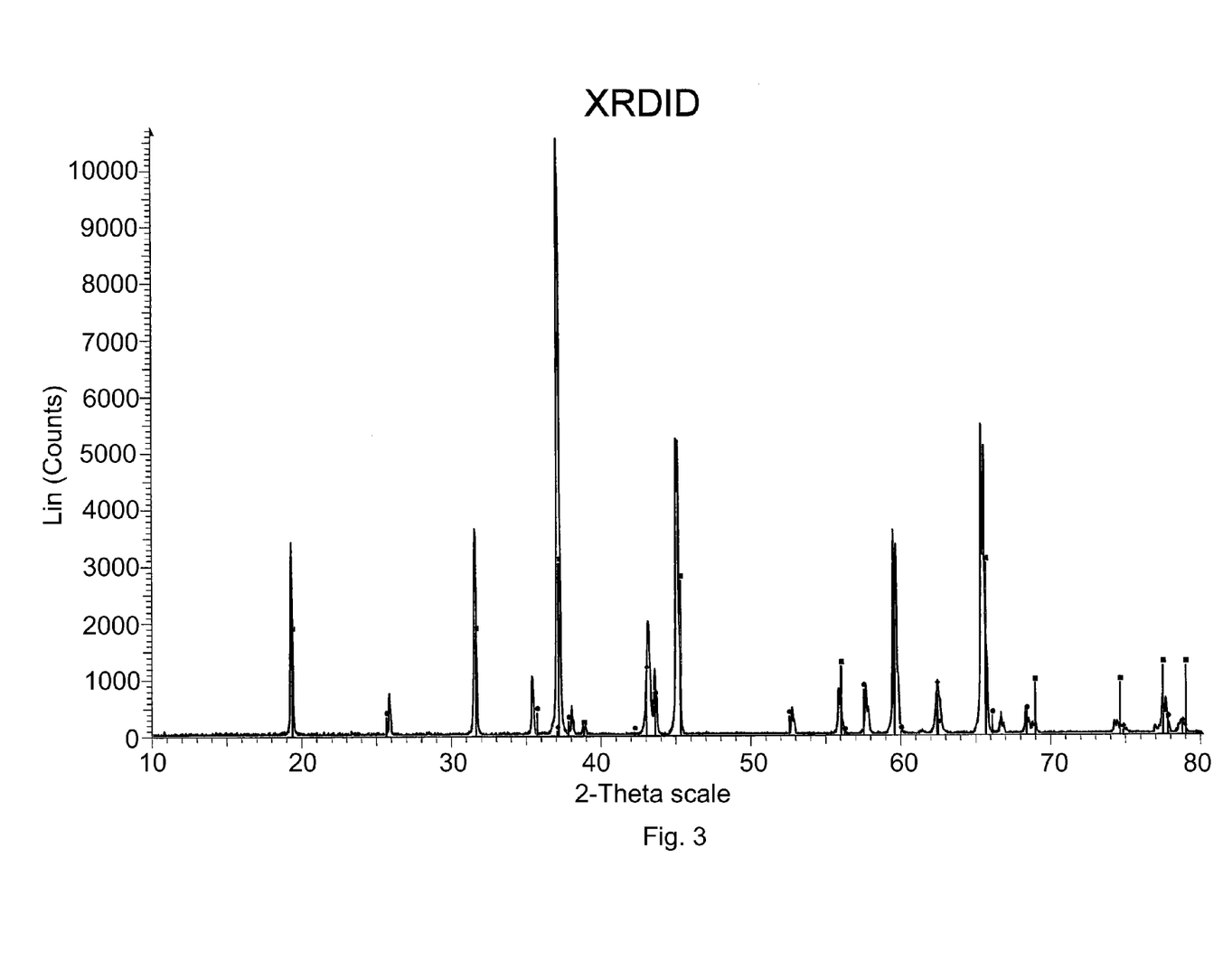
FIG. 3 is an X-ray diffraction pattern of a magnesium aluminate spinel produced without using hydrothermal aging.

In this example, 1.5 g formic acid and 92.6 of UHPA SB1 were dispersed in 600 mL DI water and 40.6 g $Mg(OH)_2$ was slowly added. The mixture was allowed to stir for 30 minutes, recovered, spray dried and calcined at 1375° C. for eight hours. XRD analysis, shown in FIG. 3, demonstrated some conversion to magnesium aluminate spinel but with substantial contamination from $Al_2O_3$. As indicated by the relatively large peak at 43 degrees 2-theta.

EXAMPLE 4

Figure 4:
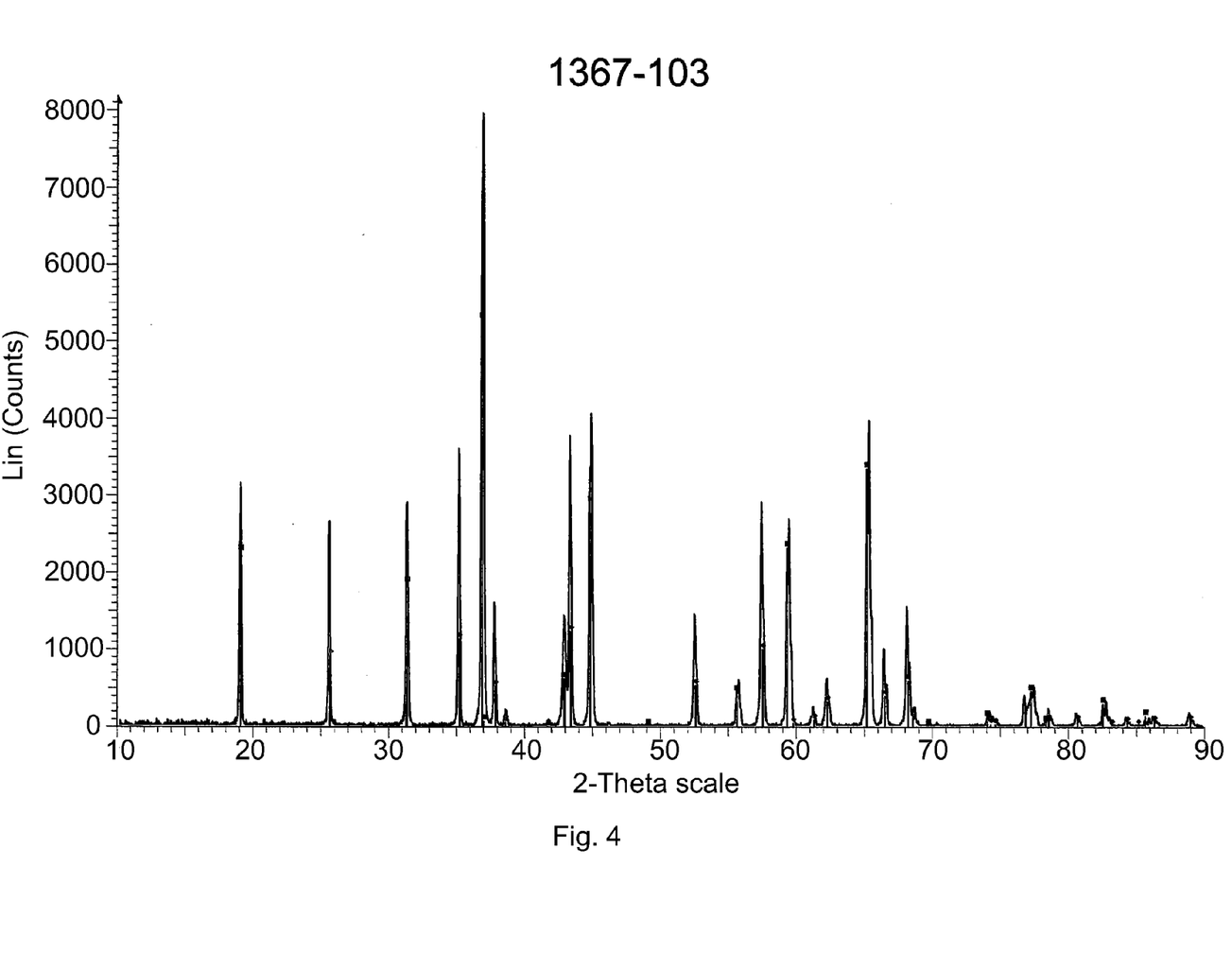
FIG. 4 is an X-ray diffraction pattern of a magnesium aluminate spinel produced without using hydrothermal aging.

In this example, 92.6 g of UHPA SB1 was dispersed in 600 mL DI water and 40.6 g $Mg(OH)_2$ was slowly added. The mixture was allowed to stir for 30 minutes, spray dried and calcined at 1375° C. for eight hours. XRD analysis of the material, shown in FIG. 4, demonstrated some conversion to magnesium aluminum spinel but with substantial contamination from $Al_2O_3$ and/or MgO as shown by the substantial peak at 43 degrees 2-theta.

EXAMPLE 5

A slurry of boehmite alumina is hydrothermally aged per the conditions of Example 1. The hydrothermally aged boehmite slurry is then mixed with an aqueous suspension of a suitable magnesium precursor, e.g., magnesium hydroxide. The water is removed and the dried spinel precursor recovered. The dried spinel precursor is then calcined to produce magnesium aluminate spinel.

EXAMPLE 6

In this example, 600 g of an Al/Mg-hexanolate containing 1.40 wt % magnesium and 3.08 wt % aluminum were hydrolyzed in a receiver in the presence of 714.0 g of deionized water containing 0.2 wt % ammonia. A white precipitate immediately formed. The supernatant alcohol was decanted. The resulting aqueous slurry was hydrothermally aged in a 1 liter Berghof autoclave for 5 hours at 210° C. and 500 rpm. The slurry was spray dried and the resultant powder was calcined for 3 hours at 1300° C. to form the magnesium aluminate spinel.

EXAMPLE 7

The procedure of Example 6 was followed except the hydrothermal aging step was omitted.

Figure 5:
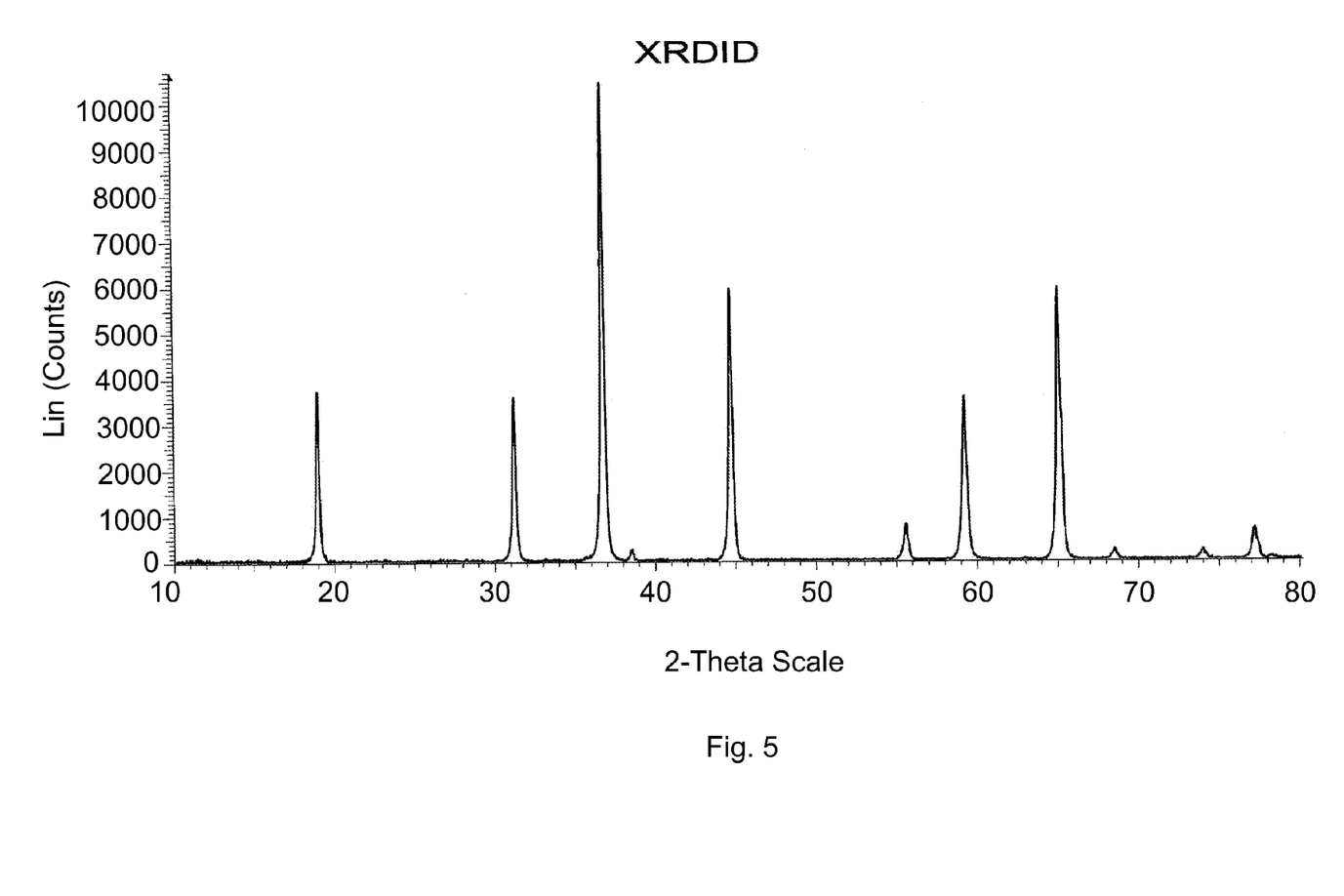
FIG. 5 is an X-ray diffraction pattern of a magnesium aluminate spinel obtained according to another aspect of the present invention.
Figure 6:
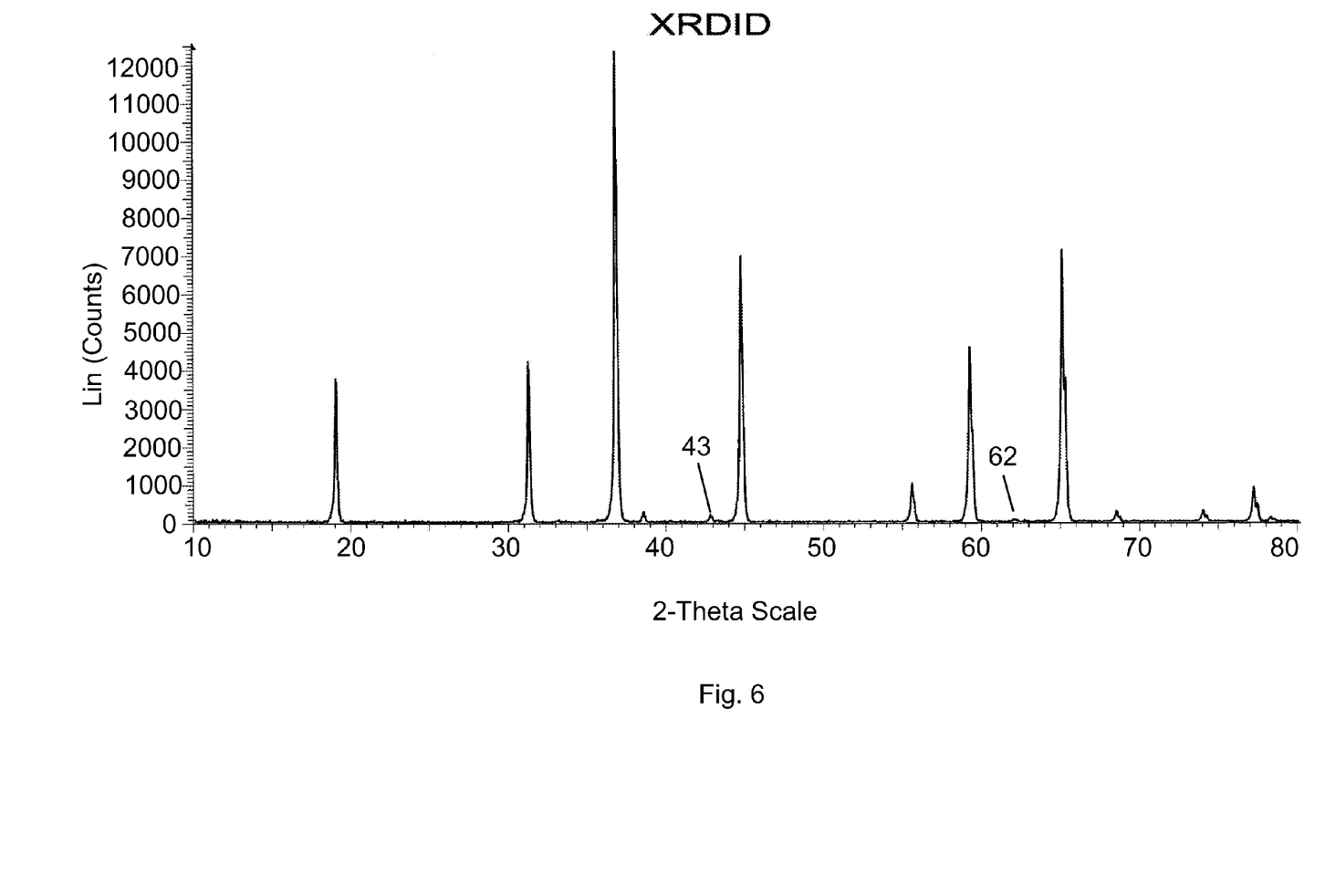
FIG. 6 is an X-ray diffraction pattern of another magnesium aluminate spinel obtained without hydrothermal aging of the spinel precursor.

With reference to FIGS. 5 and 6, there are shown XRD's of spinels formed according to the procedures of Example 6 and Example 7, respectively. As can be seen in FIG. 6, an x-ray diffraction peak at 43 degrees 2-theta, the strongest intensity peak in an x-ray diffraction pattern of alpha alumina, is found. This is also the location of the strongest peak in the x-ray diffraction pattern of magnesium oxide, the 200 peak. The extraneous peak at 43 degrees 2-theta represents residual alpha-alumina, magnesium oxide, or a combination thereof. As can be seen, FIG. 6 also shows a small peak at 62 degrees 2-theta which is the second largest diffraction peak for magnesium oxide, again indicative of residual magnesium oxide.

However, with reference to FIG. 5, it can be seen that there is no peak at 43 degrees 2-theta. The results demonstrate conclusively that spinel of much higher purity can be obtained using the hydrothermal aging step according to the process of the present invention.

As can be seen from Examples 1-4, employing Method A, one can obtain high conversions of existing aluminum precursors (boehmite) to high purity magnesium aluminate spinel without the need for additional reactants which may contaminate the product.

It can also be seen that by using the present invention (Method A), one can use a boehmite slurry or a dried boehmite powder which is resuspended, followed by hydrothermal aging of the aqueous mixture of alumina and magnesium hydroxide. In particular, the ability to produce high quality magnesium aluminate spinel by hydrothermally aging a boehmite slurry (Catapal B) and A magnesium precursor without the necessity for drying the boehmite powder is particularly attractive as it reduces production time and costs.

It can also seen that by using the method of the present invention, and in particular with reference to Method B, the boehmite alumina can be aged separate and apart from being in admixture with a magnesium precursor. Rather, the aged boehmite slurry can be mixed with a magnesium precursor suspension followed by drying and calcination to produce the magnesium aluminate spinel.

As can be seen from Examples 6 and 7, employing Method C, one can obtain high purity magnesium aluminate spinel by hydrothermally aging a slurry of a spinel precursor comprised of aluminum magnesium oxides and/or hydroxides obtained from cohydrolysis of the respective aluminum and magnesium alcoholates.

The process of the present invention allows for a truly intimate mixture of the aluminum/magnesium species of the spinel precursors. The level of uniform mixing achieved by either Method A, Method B, or Method C of the present invention is normally only feasible via coprecipitation or milling processes, both of which are known to introduce undesirable impurities, which adversely affect the optimal and perhaps strongest properties of the product produced.

As is clearly demonstrated by the X-ray diffraction patterns of the magnesium aluminate spinels produced according to the present invention, using either Method A, Method B, or Method C one can obtain spinels of exceptional purity. In particular, as can be seen by comparison of FIGS. 1-6, using the present invention involving hydrothermal aging either by Method A or Method C, the amount of aluminum oxide and/or magnesium oxide in the spinel is dramatically reduced.

This degree of purity is an important advantage since it is known that these impurities deleteriously affect the spinel, particularly in the making of windows and domes in high speed missiles and pods, transparent armor in light vehicles and goggles or face shields on infantry helmets. Additionally, the high purity magnesium aluminate spinels produced according to the present invention are useful in other applications where the presence of either aluminum oxides and/or magnesium oxides may pose problems.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A method of making spinels comprising:
    hydrothermally aging an aqueous slurry of a spinel precursor selected from the group consisting of (a) a mixture of boehmite alumina and a magnesium precursor wherein said boehmite alumina is produced by the hydrolysis of an aluminum alkoxide, (b) an aluminum magnesium oxide or hydroxide wherein said aluminum magnesium oxide or hydroxide are produced by cohydrolysis of mixed aluminum-magnesium alkoxides, and (c) mixtures thereof, to produce a hydrothermally aged slurry of a spinel precursor selected from the group consisting of (1) an aged spinel precursor slurry comprising boehmite alumina and magnesium precursor, (2) an aged spinel precursor slurry comprising an aluminum magnesium oxide or hydroxide, and (3) mixtures thereof;

drying at least one of said hydrothermally aged slurries to remove water and produce at least one dried spinel precursor; and calcining said at least one of said dried spinel precursor to produce magnesium aluminate spinel.

2. The method of claim 1, wherein said spinel precursor comprises (a) a mixture of boehmite alumina and magnesium hydroxide wherein said boehmite alumina is produced by the hydrolysis of an aluminum alkoxide.

3. The method of claim 1, wherein said spinel precursor comprises (b) an aluminum magnesium oxide or hydroxide wherein said aluminum magnesium oxide or hydroxide are produced by cohydrolysis of mixed aluminum-magnesium alkoxides.

4. The method of claim 1, wherein said hydrothermal aging is conducted at a temperature of about 100 to about 210° C.

5. The method of claim 1, wherein said hydrothermal aging is conducted for a period of from about 1 to about 6 hours.

6. The method of claim 1, wherein said hydrothermal aging is conducted at pressures ranging from about 200 to about 2,000 kPa.

7. The method of claim 1, wherein said calcining is conducted at a temperature of from about 750 to about 1,600 ° C.

8. The method of claim 1, wherein said mixture of boehmite alumina and magnesium precursor is obtained by cohydrolysis of an aluminum alkoxide and a magnesium precursor.

9. A method of making a spinel precursor comprising:
hydrothermally aging an aqueous slurry of a composition selected from the group consisting of (a) a mixture of boehmite alumina and a magnesium precursor wherein said boehmite alumina is produced by the hydrolysis of an aluminum alkoxide, (b) an aluminum magnesium oxide or hydroxide wherein said aluminum magnesium oxide or hydroxide are produced by cohydrolysis of mixed aluminum-magnesium alkoxides, and (c) mixtures thereof, to produce a hydrothermally aged slurry of a spinel precursor selected from the group consisting of (1) an aged spinel precursor slurry comprising boehmite alumina and magnesium precursor, (2) an aged spinel precursor slurry comprising an aluminum magnesium oxide or hydroxide, and (3) mixtures thereof; and drying at least one of said hydrothermally aged slurries to remove water and produce at least one dried spinel precursor.

10. The method of claim 9, wherein said spinel precursor comprises (a) a mixture of boehmite alumina and magnesium hydroxide wherein said boehmite alumina is produced by the hydrolysis of an aluminum alkoxide.

11. The method of claim 9, wherein said spinel precursor comprises (b) an aluminum magnesium oxide or hydroxide wherein said aluminum magnesium oxide or hydroxide are produced by cohydrolysis of mixed aluminum-magnesium alkoxides.

12. The method of claim 9, wherein said hydrothermal aging is conducted at a temperature of about 100 to about 210° C.

13. The method of claim 9, wherein said hydrothermal aging is conducted for a period of from about 1 to about 6 hours.

14. The method of claim 9, wherein said hydrothermal aging is conducted at pressures ranging from about 200 to about 2,000 kPa.

15. A method of making a spinel precursor comprising:
hydrothermally aging an aqueous slurry of a composition selected from the group consisting of (a) a mixture of boehmite alumina and a magnesium precursor wherein said boehmite alumina is produced by the hydrolysis of an aluminum alkoxide, (b) an aluminum magnesium oxide or hydroxide wherein said aluminum magnesium oxide or hydroxide are produced by cohydrolysis of mixed aluminum-magnesium alkoxides, and (c) mixtures thereof, to produce a hydrothermally aged slurry of a spinel precursor selected from the group consisting of (1) an aged spinel precursor slurry comprising boehmite alumina and magnesium precursor, (2) an aged spinel precursor slurry comprising an aluminum magnesium oxide or hydroxide, and (3) mixtures thereof.

16. The method of claim 15, wherein said spinel precursor comprises (a) a mixture of boehmite alumina and magnesium hydroxide wherein said boehmite alumina is produced by the hydrolysis of an aluminum alkoxide.

17. The method of claim 15, wherein said spinel precursor comprises (b) an aluminum magnesium oxide or hydroxide wherein said aluminum magnesium oxide or hydroxide are produced by cohydrolysis of mixed aluminum-magnesium alkoxides.

18. The method of claim 15, wherein said hydrothermal aging is conducted at a temperature of about 100 to about 210° C.

19. The method of claim 15, wherein said hydrothermal aging is conducted for a period of from about 1 to about 6 hours.

20. The method of claim 15, wherein said hydrothermal aging is conducted at pressures ranging from about 200 to about 2,000 kPa.

21. A method of making a spinel comprising:
hydrothermally aging an aqueous slurry of a boehmite alumina;

mixing the aged boehmite alumina slurry with an aqueous composition containing a magnesium precursor to produce an aqueous spinel precursor comprising aged boehmite alumina and said magnesium precursor;

removing water from said aqueous spinel precursor mixture to produce a dried spinel precursor solid; and calcining said dried spinel solid to produce spinel.

22. The method of claim 1, wherein the magnesium precursor comprises magnesium nitrate, magnesium oxide, magnesium acetate, or magnesium carbonate.

23. The method of claim 9, wherein the magnesium precursor comprises magnesium nitrate, magnesium oxide, magnesium acetate, or magnesium carbonate.

24. The method of claim 15, wherein the magnesium precursor comprises magnesium nitrate, magnesium oxide, magnesium acetate, or magnesium carbonate.

25. The method claim 21, wherein the magnesium precursor comprises magnesium nitrate, magnesium oxide, magnesium acetate, or magnesium carbonate.

* * * * *